Patented May 15, 1934

1,958,653

UNITED STATES PATENT OFFICE 1,958,653

ALKYLATION OF ACID NITRILES

Karl Ziegler, Heidelberg, Germany, assignor to Schering-Kahlbaum A. G., Berlin, Germany No Drawing. Application December 4, 1931, Serial No. 579,109. In Germany December 18, 1930

7 Claims. (Cl. 260—108)

My invention refers to the alkylation of acid nitriles and more especially to means whereby such alkylation can be carried through in a particularly efficient manner.

As is well known to those skilled in the art acid nitriles of the benzyl cyanide type can be alkylated by acting thereon with sodium amide to convert them into their sodium compounds, which are then reacted with alkyl halides. This method is however not applicable to aceto nitrile.

I have now found that I can introduce univalent alkyls, aralkyls and nonaromatic isocyclic radicals in a very simple manner into the α-position of the aceto nitrile and its analogues by acting on these nitriles with sodium amide in the presence of halogen compounds of the radicals mentioned above. The radicals to be introduced into the aceto nitrile may be substituted by other atoms or groups of atoms which do not react with sodium amide or, if reacting with it at all, under the particular conditions of operation, do react only very slowly, such as for instance halogen atoms or amido groups substituted by alkoxyls, aryloxy compounds or arylmercaptanes.

The sodium amide may be replaced by other amides, such as lithium amide or calcium amide, or by alkali and alkaline earth amides substituted by organic compounds, for instance sodium cyclohexyl amide, magnesium methyl amide or bromomagnesium ethyl amide, or by alkali or by alkaline earth metal hydrides.

In the majority of cases the yield of alkylated nitriles obtained in accordance with this invention exceeds 70%, being in many cases up to 90% and more of the calculated quantity.

It was impossible to foretell this effect, because one should have expected that other reactions would occur between the sodium amide and the halogen compound. It has however been found that such other reactions, if any, occur only to an insignificant extent.

The new method according to the present invention allows alkylating the aceto nitrile itself as well as aceto nitriles, which are not negatively substituted, in a great variety of ways and partly or completely at the carbon atom being in α-position relative to the CN group. I am thus enabled to produce in an extremely simple manner a great variety of nitriles whose production hitherto presented great difficulties.

The products obtained in accordance with the present invention are destined for use as intermediate products in the preparation of remedies and more particularly narcotics.

In practising my invention I may for instance proceed as follows:—

Example 1

19.7 parts by weight diethyl aceto nitrile are boiled under the reflux condenser with 3.9 parts pulverized sodium amide and 15.4 parts allylchloride in 100 parts by volume dry benzene. Within 15–16 minutes, according to the degree of subdivision of the amide, almost the total calculated quantity of ammonia will escape, whereupon the reaction product is treated with water, the benzene layer is removed by decantation and the reaction product is isolated in the usual manner. On rectification I obtain, besides the first runnings containing 7.8 parts of unchanged starting material (which can be directly reused), 16–17 parts of the known diethylallyl aceto nitrile boiling at 78° C. under 9 mms. mercury column.

If the amide and allylchloride are employed 50% in excess of the calculated quantity, the first runnings will be greatly reduced and 22–23 parts, i. e. about 80% of the calculated quantity of diethylallyl aceto nitrile are obtained.

Example 2

19.7 parts diethyl aceto nitrile are dissolved in 50 parts by volume benzene and are heated to 70–80° C. under stirring at the reflux condenser, whereupon a mixture of 15.7 parts allyl-chloride with 300 parts by volume of a suspension of sodium amide in benzene, which contains 8 parts amide, are allowed to flow in gradually. The suspension mentioned above is preferably prepared by prolonged trituration of the amide in benzene in a ball mill, colloid mill or the like and is mixed with the chloride during the flowing in by continuous stirring. The speed of inflow is regulated in accordance with the intensity of the reaction. The ammonia which escapes in about the calculated quantity can be recovered for further use. Near the end of the reaction the mixture is boiled for some time and yields 22–23 parts diethylallyl aceto nitrile.

By using the amide and chloride in slight excess the yield can be increased to 26–27 parts, i. e. to about the calculated quantity. In this case the residue obtained after distillation of the solvent can be converted by saponification without any preceding rectification into the well known diethylallyl acetamide melting at 74° C. and having vigorous narcotic properties. From diethyl aceto nitrile and the corresponding alkyl halides can be produced in an analogous manner and with similar yields the following compounds:

Benzyl diethyl aceto nitrile, a thick colourless oil boiling at 120–122° C. under 1 mm. or at 152–153° C. under 14 mms. mercury column;

Cyclohexenyl diethyl aceto nitrile, a colourless oil boiling at 129° C. under 12 mms. mercury column, having the formula $C_{12}H_{19}N$, which contains 7.92% N, as against 7.69% obtained in practice;

n-butyl diethyl aceto nitrile boiling at 86° C. under 11 mms. mercury column and having the formula $C_{10}H_{19}N$, containing 9.15% N, as against 8.96% obtained in actual practice; by saponification with 80% sulfuric acid at 150° C. the corresponding acid amide melting at 70–71° C. is obtained.

Isopropyl diethyl aceto nitrile, a colourless oil boiling at 71–73° C. under 12 mms. mercury column;

Allyl diethyl aceto nitrile, boiling at 106–107° C. under 26 mms. mercury column.

Example 3

123 parts isopropyl bromide are mixed with 56 parts ethyl isopropyl aceto nitrile and 200 parts by volume dry benzene, toluene or xylene and the mixture is heated to boiling under the reflux condenser, whereupon 20 parts finely powdered sodium amide are gradually introduced under stirring. Alternatively a suspension of the sodium amide in the same solvent is allowed to flow in gradually. It is however also possible to first finely grind the amide together with sodium chloride, sodium sulfate or some other inert solid substance, the proportions being chosen in a known way. Boiling is continued until all the ammonia has escaped, whereupon the solvent is expelled by distillation together with the isopropyl halide in excess. The distillate, to which has been added the necessary quantity of the bromide to replace the quantity already consumed, can be used in a subsequent operation. All fractions boiling above 140° C. are treated with water and acted upon in the usual manner. The ethyl di-isopropyl aceto nitrile is a colourless liquid of pleasant smell which boils at 85° C. under 13 mms. mercury column. In the preparation of this substance no steric hinderance has been observed.

Example 4

69 parts isobutyric acid nitrile are mixed with 77 parts allylchloride and the mixture is placed into a receptacle provided with means for an efficient abduction of heat. 40 parts finely subdivided sodium amide, which may be mixed with inert solid matter, are now gradually added very cautiously under continuous stirring, the temperature and speed of addition being so regulated that, while ammonia is continuously developed, no vehement reaction occurs. On the other hand the reaction should not be retarded. Preferably a temperature of about 60–80° C. is maintained. After all the amide has been added the thickish mass is heated for a short time to 100–120° C., whereupon the allyldimethyl aceto nitrile is separated out by adding water. The yield is a good one, the product forms a colourless liquid boiling at 150° C. and having a pleasant aromatic smell.

I can carry through this reaction also in a rotary drum provided with means for regulating the temperature and partly filled with balls or similar bodies, the amide being added in small lumps which are gradually ground during the reaction. In this apparatus the speed of reaction can also be influenced by varying the number of rotations of the drum. It is also possible to dilute the starting mixture from the beginning with the dimethylallyl aceto nitrile resulting in a previous operation. By proceeding in this manner the separate inert diluent can be dispensed with.

Example 5

12 parts 1-cyanogen-2-methyl-cyclohexene-(4)

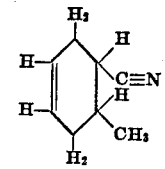

which can be produced from the corresponding acid in the usual manner by way of the amide melting at 156–157° C. and which boils at 95° C. under 28 mms. mercury column, are made to react, as described with reference to Example 2, with 12.6 parts benzyl chloride and 4 parts sodium amide. There is obtained a very fair yield of 1-cyanogen-1-benzyl-2-methyl-cyclohexene-(4)

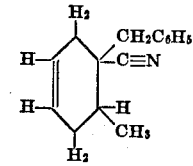

a highly viscous oil boiling at 184–187° C. under 12 mms. mercury column; it contains 6.63% N as against 7.06% N found by analysis. Similarly the 2-butyl-2-cyanogen-3-methyl-1.4-endomethylene-cyclohexene-(5)

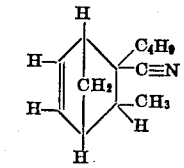

can be obtained from the corresponding starting material which contains no butyl substituent. Here the product of reaction is a highly viscous colourless oil boiling at 135–136° C. under 12 mms. mercury column.

Example 6

41 parts aceto nitrile are mixed in an autoclave with 600 parts ethyl chloride and gradually 120 parts sodium amide are forced in which have been finely ground with a quantity of a high boiling paraffine oil, neutral tar oil or the like which just suffices for forming a highly viscous paste. The reaction mixture is vigorously stirred, the temperature being first preferably kept at 40–50° C. and after the addition of about two thirds of the amide being raised to 60–70° C. The ammonia developed in the reaction is conducted through a reflux cooler under pressure to an exhaust valve. However if the dimensions of the apparatus are suitably chosen, the escape of ammonia during the reaction can be dispensed with, the pressure rising correspondingly. When the reaction has come to an end the ethyl chloride, which here also acts as a solvent, is, if desired after exhausting the ammonia, conveyed by distillation under pressure or under cooling to a low temperature into another apparatus similar to the one first used, in which it can be used in a subsequent operation after the consumed quantity has been replaced. The triethyl aceto nitrile forming the product of reaction is distilled off to separate it from the high boiling fraction. It boils at 62° C. under 10 mms. mercury column or at 173–176° C. under normal pressure.

In this example the ethyl chloride can also be replaced by ethyl bromide.

*Example 7*

120 parts sodium amide are triturated with 1000 parts by volume absolute ether to form a fine suspension, to which are then added 270–280 parts allylchloride, the mixture being now heated to boiling point in a vessel provided with a stirring device and reflux condenser. To the boiling suspension are gradually added 41 parts aceto nitrile, whereupon the boiling continues spontaneously under vigorous development of ammonia. After all the nitrile has been introduced a test is made to find out whether the addition of a further small quantity of the suspension causes a further development of ammonia. If so, further small quantities of the suspension are cautiously added. The end of the reaction can be ascertained almost as distinctly as with an indicator by the stopping of the heat and ammonia development. On this point being reached, water is added for separation of the reaction product. Already after the first rectification the triallyl aceto nitrile boils distinctly at 102° C. under 12 mms. mercury column and at 82–83° C. under 4 mms. mercury column. It forms a colourless liquid of pleasant aromatic smell. The yield is 140 parts corresponding to 87% of the calculated quantity. An analysis showed 8.73% N as against 8.7% found by calculation.

Saponification with propyl alcoholic potash results in the formation of triallyl acetamide having the form of colourless needles melting at 63–65° C. which dissolve only with difficulty in water and cold petrol ether and can be recrystallized from hot petrol ether. The analysis of the product having the formula $C_{11}H_{17}ON$ showed 7.94% N, as against 7.81% found by calculation.

The triallyl acetamide has excellent narcotic properties.

*Example 8*

Under the conditions described with reference to Example 2, 55 parts propionitrile dissolved in 100 parts by volume of dry dioxane are made to react with a mixture of 252 parts benzyl chloride and 80 parts sodium amide triturated with 500 parts dioxane. It is also possible to allow the suspension of the amide and the benzyl chloride to drip in separately or to cause the three reagents to flow in separately, if care is taken that they enter in corresponding quantities, or that at least at the reaction temperature of about 80–100° C. a temporary excess of the amide is prevented. At the end of the reaction the sodium chloride, which has separated out, is dissolved by adding water and at the same time the dibenzyl propionitrile is separated out under the form of an oil which soon solidifies. The crystalline mass is filtered by suction and washed with methanol. One obtains 200 parts (equal to 90% of the calculated quantity) of the product, which already melts almost at the correct temperature and can easily be recrystallized from methanol. The pure product having the formula $C_{17}H_{17}N$ melts at 101–102° C. It contains 5.67% N found by analysis as against 5.95% found by calculation.

In this example the dioxane can be replaced by tertiary amines insoluble in water, such as the dimethyl aniline or the like. In that case the temperature is kept at about 80° C. without the mixture being heated to boiling point. The nitrile can be separated at the end of the reaction by the addition of dilute watery acid, from which the solvent can easily be recovered by the addition of an alkali.

*Example 9*

If the diethyl aceto nitrile in Example 2 is replaced by 14 parts n-butyro nitrile, double the quantities of allylchloride and sodium amide being added, but the operation carried through in all other respects as described with reference to Example 2, there are obtained 26–27 parts (equal to 85–90% of the calculated quantity) of pure diallyl-butyro nitrile $C_{10}H_{15}N$, a colourless liquid having a pleasant smell and a constant boiling point of 83–84° C. under 12 mms. mercury column. The analysis showed a nitrogen content of 9.53% as against 9.4% found by calculation.

Saponification with propyl alcoholic potash results in the formation of diallyl ethylacetamide forming colourless needles which melt at 66° C. and which can best be recrystallized from hot petrol ether. This compound is an excellent narcotic.

In an analogous manner diallyl-isovalero nitrile can be recovered from isovalero nitrile, the yield being 80% of the calculated percentage. Owing to the methyl ethyl-acetic acid present in the commercial isovalerianic acid the product of reaction, which contains a small quantity of allyl-methyl-ethylaceto nitrile, has a boiling point which varies under 12 mms. mercury column between 89–96° C.

*Example 10*

If proceeding as described with reference to Example 9, however replacing the butyro nitrile by the corresponding quantity of monoallyl aceto nitrile (produced in accordance with Example 13), the allylchloride by ethyl-bromide, there is obtained the diethyl-allyl-aceto nitrile described in connection with Examples 1 and 2, the yield being a very high one.

*Example 11*

9.7 parts n-caproic acid nitrile are mixed with 39 parts n-octylbromide in 50 parts by volume of a fraction boiling between 150–160° C. of purified tar hydrocarbons. The mixture is allowed to boil under reduced pressure, the temperature being adjusted between 70 and 100° C., and a suspension of 8 parts sodium amide in 100 parts by volume of the same solvent are allowed to drip in during 30 minutes. Boiling is continued during further two hours under similar conditions. After decomposition of the reaction product with water the diluent is removed by distillation in vacuo and the residue is rectified in a high vacuum. The dioctyl caproic acid nitrile obtained in very good yield is a highly viscous colourless oil boiling at 191–193° C. under 0.03 mms. mercury column. It has the formula $C_{22}H_{43}N$ containing 4.36% N as against 4.63% found by analysis.

*Example 12*

41 parts aceto nitrile are mixed with 137 parts butyl bromide (equivalent quantities) and 50 parts by volume ether. Into the agitated mixture a suspension of 40 parts sodium amide in 300 parts ether is introduced at 30–40° C. A very vehement reaction sets in and the correct quantity of ammonia escapes. Boiling is continued for a short time and the product of reaction is then treated for the recovery of the nitrile. On rectification 68 parts (corresponding to 70% of the calculated quantity) of a fraction are obtained, which boils at 51° C. under 12 mms. mercury column and consists of pure n-caproic acid nitrile. The last runnings are formed by 15 parts dibutyl aceto nitrile boiling at 97–100° C. under 12 mms. mercury column. This hitherto unknown nitrile is a colourless liquid of not unpleasant smell.

If the aceto nitrile is used in slight excess, the formation of dibutyl aceto nitrile can be greatly reduced and the yield of caproic acid nitrile, calculated on the butyl halide, greatly improved.

The ether may be replaced by other inert solvents. In order to be able to easily keep the temperature of reaction constant, I may use as a diluent a cheap and little volatile substance, to which I may add a smaller quantity of ether to act as a means for regulating the temperature.

I have produced in an analogous manner:

n-capric acid nitrile from octyl halide, the nitrile showing the known properties;

n-stearic acid nitrile from cetyl bromide, melting at 42° C.;

γ-phenyl-butyric acid nitrile from phenethyl bromide;

Hydrocinnamic acid nitrile from benzyl chloride, this nitrile boiling at 123–124° C. under 11 mms. mercury column, dibenzyl aceto nitrile melting at 101° C. being formed as a by-product.

Example 13

300 parts aceto nitrile are mixed with 77 parts allylchloride or with 122 parts allyl bromide and 40 parts sodium amide ground to a fine powder are added under vigorous stirring at 50–60° C., whereupon the reaction mixture is heated until the development of ammonia has come to an end. I now remove the aceto nitrile in excess, which acts as a solvent, by distillation through a column, this aceto nitrile being adapted for use in a subsequent operation. Before final rectification of the residue boiling above 100° C., the sodium halide admixed to it is preferably removed by washing with water. I thus obtain the known allyl-aceto nitrile boiling at 140° C., which can be converted into diethyl-allyl-aceto nitrile as described with reference to Example 10.

Example 14

69 parts n-butyro nitrile are boiled under the reflux condenser with 150 parts ethyl bromide and 60 parts ether, whereupon 40 grams sodium amide suspended in 300 ccms. ether are allowed to drip in slowly. A vigorous reaction ensues and the calculated quantity of ammonia escapes, which can be freed from the ether and ethyl bromide carried along by cooling to a low temperature, by washing with cooled water, by sprinkling with high boiling organic wash oils or in some other suitable manner, to be used for other purposes, for instance for the production of fresh quantities of sodium amide. When the reaction has come to an end, the ether together with the ethyl bromide in excess is distilled off and the mixture combined with the ether and ethyl bromide recovered from the ammonia is used in a new operation. From the residue of the distillation the alkali bromide is removed in a suitable manner by filtration or by washing with water and the residue is then subjected to rectification.

At first a small quantity of butyronitrile passes over followed by an intermediate fraction and thereafter by 67–68 parts (amounting to 70% of the calculated quantity) diethyl aceto nitrile, which boils between 141–147° C., mainly at 144–145° C. After another intermediate fraction there is obtained a second running formed of 4 parts triethyl aceto nitrile boiling at 173–176° C. By once more rectifying the intermediate fractions the yield of diethyl aceto nitrile rises to 74 parts or 76.5% of the total quantity of butyronitrile used. If the subsequently recovered quantity of the starting material is taken into account, this percentage is increased further.

Similar results are obtained if instead of 69 parts butyronitrile 20.5 parts acetonitrile are used. While the absolute yields now drop to about one half, the acetonitrile consuming two molecules ethyl bromide, the relative yields are almost the same as if starting from butyronitrile.

The diethyl acetonitrile produced in one or the other manner can be readily converted by saponification with excellent yield into diethyl acetic acid and further into the well known derivatives of bromo-diethyl acetic acid, which are known to have a narcotic effect. The diethyl acetonitrile can also serve as starting material in the preparation, according to Examples 1 and 2, of the highly valuable diethyl-allyl-acetonitrile, which may however also be obtained in connection with the reaction above described in a single operation from butyronitrile or acetonitrile.

In this case, after ethylation has come to an end, 77 parts allylchloride and further 40 parts sodium amide, or if acetonitrile was used as starting material, one half of these quantities are added and the mixture heated to boiling until the development of ammonia has ceased. The ether may be replaced by benzene and the operation carried out as described with reference to Example 2. In every case a highly valuable product of reaction is obtained which consists for the greater part of diethyl-allyl-acetonitrile.

Example 15

69 parts n-butyronitrile are dissolved in 500 parts n-butylchloride and the solution is heated to boiling point under the reflux condenser. Under stirring 40 parts finely ground sodium amide or the corresponding quantity of the amide in form of a paste as above described are introduced. Boiling is continued until the development of ammonia has come to an end, whereupon the product is filtered or washed with water and rectified. The first running consists of the large excess of butylchloride which served as a diluent and which is recovered almost completely. Monobutyl butyronitrile now passes over as a colourless liquid boiling at 68–70° C. under 12 mms. mercury column. Now follows a fraction boiling at 110–120° C. under the same pressure and containing the dibutyl butyronitrile. This fraction can readily be made to disappear if a quantity of sodium amide is used from the beginning, which is insufficient for a complete reaction. One then obtains a mixture of butyronitrile and butyl chloride which can be used for subsequent operations.

Other conditions of dilution than above described may be chosen; the butylchloride may be replaced by butylbromide.

In an analogous manner diethyl acetonitrile and methyl-ethyl acetonitrile can be prepared from butyronitrile, the process being carried out under pressure in an autoclave in accordance with Example 6, monohalo methane and monohalo ethane being used as solvents.

*Example 16*

If operating as described with reference to Example 14 or 15, but replacing the halides used by corresponding quantities of isopropyl halide, one obtains mono-isopropyl butyronitrile, a colourless liquid boiling at 156–158° C., the yield being 80% and more of the calculated quantity. This compound can be readily converted in a well known manner into isopropyl-bromobutyramide melting at 50–51° C., which is known as a narcotic.

*Example 17*

69 parts isobutyric acid nitrile are mixed with 170 parts 1.3-chloro-bromopropane and 300–400 parts by volume dry benzene. The mixture is heated to boiling point and 39 parts sodium amide suspended in benzene are allowed to flow in gradually, the operation being further conducted as above described.

One thus obtains α,α-dimethyl-chloro-valeric acid nitrile.

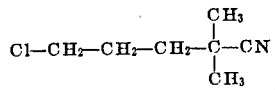

a colourless liquid boiling at 103–104° C. under 16 mms. mercury column 0.1736 grams of the substance consumed 11.93 ccms. of n/10—AgNO₃ corresponding to 24.4% Cl, as against 24.4% calculated on C₇H₁₂NCl.

*Example 18*

Similarly as described with reference to Example 17, diethyl aceto nitrile is made to react with diethyl amino ethylchloride. On distilling the product of reaction there is first obtained a small first running of unchanged diethyl-amino-ethyl-chloride and thereafter the main fraction boiling at 119–120° C. under 14 mms. mercury column. This crude product still contains some diethyl-acetamidine, which can be removed by repeated washing with small quantities of water, preferably after having previously dissolved the entire fraction in ether. The amidine is removed by titrating the wash waters with acids, the removal is completed when only small and constant quantities of alkali are fixed.

Repeated rectification results in the pure di-ethyl-amino-triethyl-aceto nitrile:

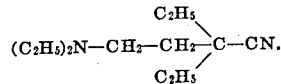

boiling at 129–130° C. under 17 mms. mercury column and identified by titrating with n/10-acid, 0.2169 grams consuming 11.15 ccms., as against 11.01 ccms. obtained by calculation.

I have produced in a similar manner α, α-dimethyl-γ-methoxybutyronitrile (from isobutyric acid nitrile and β-methoxy-ethylbromide), a colourless liquid boiling at 67° C. under 14 mms. mercury column, which was identified by ascertaining the methoxyl, 0.1610 grams yielding 0.3083 grams silver iodide, which means 24.8% OCH₃, as against 24.4% calculated on C₆H₁₀N(OCH₃).

λ-phenoxy-α-ethyl-butyronitrile

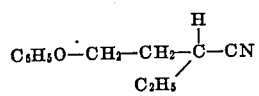

from butyro nitrile and β-phenoxy-ethyl bromide or from ethyl bromide and phenoxy-butyro nitrile. This compound is a colourless oily liquid boiling at 170–171° C. under 14 mms. mercury column. As a by-product is formed diphenoxy-ethyl-butyro nitrile boiling at 200–209° C. under 0.4 mms. mercury column.

Into the monophenoxy-butyronitrile other radicles, for instance benzyl, may be introduced, for instance in accordance with the special process described with reference to Example 2.

The benzyl-ethyl-phenoxyethyl-aceto nitrile

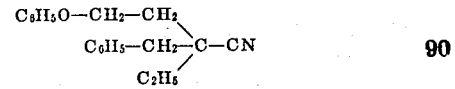

is a highly viscous oil boiling at 170–175° C. under 0.5 mms. mercury column.

α, α-dimethyl-γ-[(p)-tolyl-mercapto]-butyro nitrile

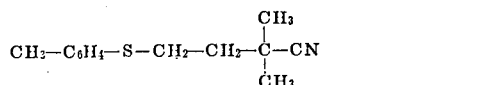

from isobutyric acid nitrile and β-chloro ethyl-(p)-tolyl sulfide.

The new compound is an oil boiling at 186–188° C. under 14 mms. mercury column, its constitution being ascertained by determination of the sulfur, 0.1062 grams yielding 0.1153 grams BaSO₄ equal to 14.9% S, as against 14.6% calculated on C₁₃H₁₇NS.

*Example 19*

700 grams isobutyric acid nitrile dissolved in 1.5 kgs. dry toluene are boiled under the reflux condenser with 300 grams sodium hydride of 80% and 1300 grams benzyl chloride until no sodium hydride can be traced any more in the mixture. After decomposition with water and removal of the toluene by distillation the residue is rectified in vacuo. One thus obtains a good yield of α-benzyl-isobutyric acid nitrile which on solidifying forms a colourless crystalline mass melting at 57° C.

In this example the toluene can be replaced as a solvent by other inert compounds, such as dioxane, xylene, or cyclohexylmethyl ether. The sodium hydride may be replaced by the hydrides of other alkali or alkaline earth metals, for instance by calcium hydride. Also in these cases the use of fine suspensions of the metal compounds in inert solvents has been found to be particularly useful. The suspensions are prepared as described with reference to the sodium amide by prolonged trituration with the solvent in a ball mill, colloid mill or a similarly acting device.

*Example 20*

30 parts sodium hydride of 80% are mixed by kneading at 100–120° C. with 300 parts dry cyclohexyl amine. After the development of hydrogen has come to an end, an inert solvent, for instance ether or benzene is added and after an intimate mixing a very fine suspension of sodium cyclohexyl amide in the solvent is obtained, which can be used as such in the reactions described with reference to Examples 2, 5, 7 and 9, the yield being in all cases substantially the same as described. The cyclohexyl amine can be readily recovered at the end of the operations by shaking with acids.

Similar synthetical processes can also be carried out with fine suspensions of lithium and magnesium amides and with their organically substituted derivatives, such as obtainable for instance by introducing ammonia or amines into solutions of lithium alkyls or magnesium compounds according to Grignard.

It should be particularly noted that the different modes of applying the principle underlying the present invention, which are described in the examples, can be combined with one another in the most varied manner and the starting materials used in the different examples may frequently be exchanged without any fundamental change in the results.

When experimenting with the new process there were produced apart from the substances enumerated in the examples quite a number of other nitriles as follows:

Diallyl-aceto nitrile, boiling at 73–74° C. under 12 mms. mercury column.

Dipropyl-aceto nitrile, boiling at 183–184° C. under 760 mms. mercury column.

Isobutyl-aceto nitrile, boiling at 154–157° C. under 760 mms. mercury column.

Monopropyl-propionitrile, boiling at 146° C. under 760 mms. mercury column.

Dipropyl-propionitrile, boiling at 68–70° C. under 10 mms. mercury column.

Monobenzyl-propionitrile, boiling at 130–135° C. under 17 mms. mercury column.

Isopropyl-ethylallyl-acetonitrile, boiling at 80–81° C. under 10 mms. mercury column.

Secondary butyl-acetonitrile, boiling at 152–153° C. under 760 mms. mercury column.

No difficulty will be experienced in selecting for the production of any one of these nitriles from the examples the most preferable modification of the process.

Various changes may be made in the details disclosed in the foregoing specification without departing from the invention or sacrificing the advantages thereof.

I claim:—

1. The method of alkylating acid nitriles comprising acting with a metal compound belonging to the group formed by alkali and alkaline earth metal hydrides and substituted or unsubstituted alkali metal amides on nitriles having the general formula

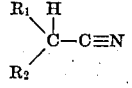

wherein $R_1$ and $R_2$ may be equal or may differ and represent H or a saturated or unsaturated alkyl or aralkyl or a non aromatic isocyclic radicle, but may form together with the adjoining carbon atom an isocyclic system, in the presence of halides corresponding to the general formula RX, wherein X is a halogen and R is a saturated or unsaturated alkyl-, aralkyl or a non aromatic isocyclic radicle, unsubstituted or substituted by alkoxy-, aryloxy- or arylmercapto groups, amido groups or halogen atoms.

2. The method of alkylating acid nitriles comprising acting with an alkali amide on nitriles having the general formula

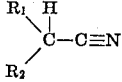

wherein $R_1$ and $R_2$ may be equal or may differ and represent H or a saturated or unsaturated alkyl or aralkyl or a non aromatic isocyclic radicle, but may form together with the adjoining carbon atom an isocyclic system, in the presence of halides corresponding to the general formula RX, wherein X is a halogen and R a saturated or unsaturated alkyl, aralkyl or a non aromatic isocyclic radicle, unsubstituted or substituted by alkoxy-, aryloxy- or arylmercapto groups, amido groups or halogen atoms.

3. The method of alkylating acid nitriles comprising acting with sodium amide on nitriles having the general formula

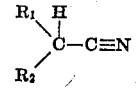

wherein $R_1$ and $R_2$ may be equal or may differ and represent H or a saturated or unsaturated alkyl or aralkyl or a non aromatic isocyclic radicle, but may form together with the adjoining carbon atom an isocyclic system, in the presence of halides corresponding to the general formula RX, wherein X is a halogen and R is a saturated or unsaturated alkyl-, aralkyl or a non aromatic isocyclic radicle, unsubstituted or substituted by alkoxy-, aryloxy- or arylmercapto groups, amido groups or halogen atoms.

4. The method of alkylating acid nitriles comprising acting with an alkali hydride on nitriles having the general formula

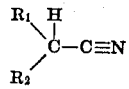

wherein $R_1$ and $R_2$ may be equal or may differ and represent H or a saturated or unsaturated alkyl or aralkyl or a non aromatic isocyclic radicle, but may form together with the adjoining carbon atom an isocyclic system in the presence of halides corresponding to the general formula RX, wherein X is a halogen and R is a saturated or unsaturated alkyl-, aralkyl or a non aromatic isocyclic radicle, unsubstituted or substituted by alkoxy-, aryloxy- or arylmercapto groups, amido groups or halogen atoms.

5. The method of alkylating acid nitriles comprising acting with sodium hydride on nitriles having the general formula

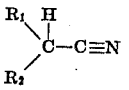

wherein $R_1$ and $R_2$ may be equal or may differ and represent H or a saturated or unsaturated alkyl or aralkyl or a non aromatic isocyclic radicle, but may form together with the adjoining carbon atom an isocyclic system, in the presence of halides corresponding to the general formula RX, wherein X is a halogen and R is a saturated or unsaturated alkyl-, aralkyl or a non aromatic isocyclic radicle, unsubstituted or substituted by alkoxy-, aryloxy- or arylmercapto groups, amido groups or halogen atoms.

6. The method of producing trialkyl acetonitriles comprising acting with sodium amide on acetonitrile in the presence of alkyl halides.

7. The process of producing triallyl acetonitrile comprising acting with sodium amide on acetonitrile in the presence of an allyl halide.

KARL ZIEGLER.